United States Patent
Huang et al.

(10) Patent No.: US 9,946,464 B2
(45) Date of Patent: *Apr. 17, 2018

(54) SYSTEMS AND METHODS FOR PREDICTING COMPRESSIBILITY OF DATA

(71) Applicant: Western Digital Technologies, Inc., San Jose, CA (US)

(72) Inventors: Wei Huang, San Jose, CA (US); Sanjay Ramakrishna Pillay, San Jose, CA (US); Sanjay Subbarao, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/625,970

(22) Filed: Jun. 16, 2017

(65) Prior Publication Data
US 2017/0285966 A1    Oct. 5, 2017

Related U.S. Application Data

(63) Continuation of application No. 14/688,939, filed on Apr. 16, 2015, now Pat. No. 9,710,166.

(51) Int. Cl.
*G06F 3/06*   (2006.01)

(52) U.S. Cl.
CPC .......... *G06F 3/0608* (2013.01); *G06F 3/064* (2013.01); *G06F 3/0673* (2013.01)

(58) Field of Classification Search
CPC ....... G06F 3/0608; G06F 3/064; G06F 3/0673
See application file for complete search history.

(56) References Cited

U.S. PATENT DOCUMENTS 6,349,150 B1   2/2002  Jones
6,757,684 B2   6/2004  Davidson et al.
7,961,960 B2   6/2011  Bashyam et al.
(Continued)

OTHER PUBLICATIONS

Harnik et al., "To Zip or not to Zip: Effective Resource Usage for Real-Time Compression", 11th USENIX Conference on File and Storage Technologies (FAST '13), USENIX Association, downloaded from https://www.usenix.org/system/files/conference/fast13/fast13-final38.pdf, pp. 229-241.
(Continued)

*Primary Examiner* — Eric Cardwell
(74) *Attorney, Agent, or Firm* — Loza & Loza, LLP; Gabriel Fitch

(57) ABSTRACT

Systems and methods for predicting the compressibility of data in a flash storage device are provided. One such method involves extracting byte intervals from the block of data, each of the byte intervals consisting of a preselected number of bytes, performing a hash function to map the byte intervals into a plurality of bins, the plurality of bins comprising one bin for each possible value of the byte intervals, incrementing a hit count each time more than one of the byte intervals is mapped into a single bin of the plurality of bins, and determining whether to compress the block of data based on a comparison of a ratio of the hit count to a total number of the byte intervals and a preselected threshold. This method may be implemented in hardware to ensure fast and efficient execution.

18 Claims, 5 Drawing Sheets

(56) References Cited

U.S. PATENT DOCUMENTS

| 8,468,315 B2 | 6/2013 | Browne et al. |
|---|---|---|
| 2013/0254441 A1 | 9/2013 | Kipnis et al. |
| 2014/0195498 A1 | 7/2014 | Asher et al. |
| 2014/0215170 A1 | 7/2014 | Scarpino et al. |
| 2014/0244604 A1* | 8/2014 | Oltean ............ H03M 7/30 707/693 |

OTHER PUBLICATIONS

Chiou et al., "Prediction-Cabable Data Compression Algorithms for Improving Transmission Efficiency on Distributed Systems", National Taiwan University, Apr. 2000, downloaded from http://ntur.lib.ntu.edu.tw/bitstream/246246/2007041910021399/1/00840982.pdf, 8 pages.

StackOverflow.com, "How to efficiently predict if data is compressible", Aug. 2011, available at http://stackoverflow.com/questions/7027022/how-to-efficiently-predict-if-data-is-compressible, 10 pages.

* cited by examiner

|  | alice29.txt | asyoulik.txt | cp.html | fields.c | grammar.lsp | kennedy.xls | lcet10.txt | plrabn12.txt | ptt5 |
|---|---|---|---|---|---|---|---|---|---|
| original size | 152089 | 125179 | 24603 | 11150 | 3721 | 1029744 | 426754 | 481861 | 513216 |
| compressed size | 54435 | 48951 | 7999 | 3143 | 1246 | 206779 | 144885 | 195208 | 56443 |
| compression ratio | 2.79395609 | 2.5572307 | 3.075759 | 3.547566 | 2.98635634 | 4.979925428 | 2.945467 | 2.468449039 | 9.092642 |
| repeated data pairs ratio | | | | | | | | | |
| 16 bits | 80.61% | 79.37% | 72.54% | 80.16% | 80.97% | 83.14% | 80.52% | 81.62% | 93.69% |
| 16 bits random | 80.72% | 79.51% | 72.76% | 80.23% | 81.02% | 83.20% | 80.63% | 81.71% | 93.73% |
| 15 bits random | 80.71% | 79.51% | 72.75% | 80.27% | 81.08% | 83.24% | 80.60% | 81.72% | 93.74% |
| 14 bits random | 80.85% | 79.63% | 73.00% | 80.37% | 81.24% | 83.41% | 80.83% | 81.81% | 93.76% |
| 13 bits random | 80.83% | 79.66% | 73.26% | 80.48% | 81.34% | 83.55% | 80.76% | 81.89% | 93.79% |
| 12 bits random | 81.51% | 80.34% | 74.25% | 81.29% | 81.72% | 84.07% | 81.48% | 82.39% | 93.94% |
| 11 bits random | 81.99% | 80.99% | 75.44% | 82.11% | 82.47% | 84.47% | 82.01% | 82.72% | 94.05% |
| 10 bits random | 83.81% | 82.93% | 79.17% | 83.60% | 84.46% | 85.76% | 83.58% | 84.55% | 94.39% |

|  | sum | xargs.1 | D0c1.doc | D0c2.doc | pdf1.pdf | pdf2.pdf | Xl1.xls | Xl2.xls |
|---|---|---|---|---|---|---|---|---|
| original size | 38240 | 4227 | 22246 | 78336 | 852635 | 372717 | 1492974 | 1494759 |
| compressed size | 12924 | 1756 | 18742 | 15951 | 833921 | 361898 | 1481190 | 1482973 |
| compression ratio | 2.95883627 | 2.407175399 | 1.18696 | 4.91104 | 1.022440975 | 1.029895164 | 1.007956 | 1.007947549 |
| repeated data pairs ratio | | | | | | | | |
| 16 bits | 73.72% | 76.20% | 16.50% | 83.80% | 4.50% | 4.80% | 2.40% | 2.40% |
| 16 bits random | 73.91% | 76.29% | 17.70% | 83.90% | 5.90% | 6.20% | 3.80% | 3.80% |
| 15 bits random | 73.93% | 76.24% | 18.50% | 83.90% | 7.30% | 7.50% | 5.20% | 5.30% |
| 14 bits random | 74.21% | 76.48% | 20.80% | 84.10% | 9.90% | 10.10% | 8.00% | 8.00% |
| 13 bits random | 74.50% | 76.38% | 24.30% | 84.30% | 14.80% | 15.00% | 13.10% | 13.10% |
| 12 bits random | 75.29% | 77.28% | 31.50% | 84.90% | 23.70% | 23.90% | 22.40% | 22.40% |
| 11 bits random | 76.76% | 78.42% | 42.90% | 85.70% | 38.00% | 38.00% | 37.10% | 37.10% |
| 10 bits random | 79.24% | 80.45% | 58.30% | 87.30% | 56.80% | 56.80% | 56.50% | 56.50% |

*FIG. 3*

|  | D0c1.doc | D0c2.doc | D0c3.doc | mpp1.mpp | pdf1.pdf | pdf2.pdf | ppt1.ppt | ppt2.ppt | ppt3.ppt | ppt4.ppt |
|---|---|---|---|---|---|---|---|---|---|---|
| original size | 22246 | 78336 | 102040 | 3026944 | 852635 | 372717 | 3134417 | 1334154 | 1329803 | 754315 |
| compressed size | 18742 | 15951 | 84905 | 598356 | 833921 | 361898 | 2937646 | 1296107 | 1242674 | 731115 |
| compress rate | 15.75% | 79.64% | 16.79% | 80.23% | 2.19% | 2.90% | 6.28% | 2.85% | 6.55% | 3.08% |
| 16-11random | 42.90% | 85.70% | 45.08% | 88.25% | 38.00% | 38.00% | 39.63% | 38.38% | 39.41% | 38.55% |
| 45% threshold | NOT Compress | Compress | Compress | Compress | NOT Compress | NOT Compress | NOT Compress | NOT Compress | NOT Compress | NOT Compress |
| 50% threshold | NOT Compress | Compress | NOT Compress | Compress | NOT Compress | NOT Compress | NOT Compress | NOT Compress | NOT Compress | NOT Compress |

|  | ppt5.ppt | ppt6.ppt | test.v | ver1.v | ver2.v | ver3.v | XL1.xls | XL2.xls | XL3.xls |
|---|---|---|---|---|---|---|---|---|---|
| original size | 593284 | 930931 | 3353 | 13760 | 14639 | 122936 | 1492974 | 1494759 | 1494759 |
| compressed size | 523629 | 838993 | 1210 | 3340 | 3190 | 16270 | 1481190 | 1482973 | 1482973 |
| compress rate | 11.74% | 9.88% | 63.91% | 75.73% | 78.21% | 86.77% | 0.79% | 0.79% | 0.79% |
| 16-11random | 41.03% | 40.85% | 78.40% | 82.60% | 84.52% | 90.08% | 37.10% | 37.10% | 37.12% |
| 45% threshold | NOT Compress | NOT Compress | Compress | Compress | Compress | Compress | NOT Compress | NOT Compress | NOT Compress |
| 50% threshold | NOT Compress | NOT Compress | Compress | Compress | Compress | Compress | NOT Compress | NOT Compress | NOT Compress |

SYSTEMS AND METHODS FOR PREDICTING COMPRESSIBILITY OF DATA

CROSS-REFERENCE TO RELATED APPLICATION(S)

This application is a continuation of U.S. patent application Ser. No. 14/688,939, filed on Apr. 16, 2015, and entitled, "SYSTEMS AND METHODS FOR PREDICTING COMPRESSIBILITY OF DATA", the entire content of which is incorporated herein by reference.

FIELD

Aspects of the disclosure relate generally to data compression, and more specifically, to systems and methods for predicting the compressibility of data in a flash storage device.

BACKGROUND

Flash storage devices are increasing used for storing data in electronic applications. Flash storage devices involve a nonvolatile memory in which data may be electrically erased and programmed often in data blocks of a selected size. Real time lossless compression is widely used in data storage systems, and specifically in flash storage, because it helps to reduce resource usage. For example, in a write flow for a flash storage device, adding compression may provide a number of advantages. These advantages can include a reduction in the total number of writes, thereby enabling a higher effective over provisioning and reducing write amplification. These advantages can also include enabling a larger capacity drive using elastic storage and reduction of power during writes due to reduced writes to the flash storage.

On the other hand, the data storage speed may be decreased substantially because compression processes can consume large amounts of resources. The compression processes often involve substantial and intensive calculations, which correspond to significant consumption of power and time. However, many data blocks may have limited compressibility. More specifically, the resources consumed to compress these data blocks may not be worth expending because little storage space will be saved. In cases when the data is effectively non-compressible, the power and time expended are largely wasted. Thus, a method that can predict a compressibility of data blocks, so the storage system can know whether it would be efficient to compress a given data block and possibly avoid compressing data blocks having low compressibility, might save substantial amounts of resources (e.g., power and latency). Saving these resources can improve the storage system performance.

Some data compressibility prediction algorithms exist based primarily on software implementations. However, for real time storage systems such as flash storage, the compressibility prediction by software may be unrealistic because it is too slow. Also, there are some implementations involving both software and hardware. Such solutions may be faster than software implemented algorithms but they are generally still not fast enough for real time storage systems such as flash storage. In addition, these implementations can be overly complicated.

SUMMARY

In one embodiment, the disclosure relates to an algorithm for predicting a compressibility of a block of data. In such case, the algorithm can look for repeats of byte intervals in a compression history buffer storing data from the data block. The algorithm can use a count of the repeats of the byte intervals as a score to predict the compressibility of the data in the history buffer, which may, for example, be taken from a data block of a flash storage device. In several embodiments, this algorithm may be implemented primarily or exclusively in hardware to ensure fast and efficient execution.

In another embodiment, the disclosure relates to a method for predicting a compressibility of a block of data including extracting byte intervals from the block of data, each of the byte intervals consisting of a preselected number of bytes, performing a hash function to map the byte intervals into a plurality of bins, the plurality of bins comprising one bin for each possible value of the byte intervals, incrementing a hit count each time more than one of the byte intervals is mapped into a single bin of the plurality of bins, and determining whether to compress the block of data based on a comparison of a ratio of the hit count to a total number of the byte intervals and a preselected threshold.

In another embodiment, the disclosure relates to a system for predicting a compressibility of a block of data including an extractor configured to extract byte intervals from the block of data, each of the byte intervals consisting of a preselected number of bytes, a hash configured to map the byte intervals into a plurality of bins, the plurality of bins comprising one bin for each possible value of the byte intervals, a counter configured to increment a hit count each time more than one of the byte intervals is mapped into a single bin of the plurality of bins, a compression determiner configured to determine whether to compress the block of data based on a comparison of a ratio of the hit count to a total number of the byte intervals and a preselected threshold.

BRIEF DESCRIPTION OF THE DRAWINGS

FIG. 3 is a table illustrating exemplary simulation results for a system for predicting a compressibility of various test blocks of data in accordance with one embodiment of the disclosure.

FIG. 5 is a table illustrating exemplary test results for a process for predicting a compressibility of various test blocks of data in accordance with one embodiment of the disclosure.

DETAILED DESCRIPTION

Figure 1:
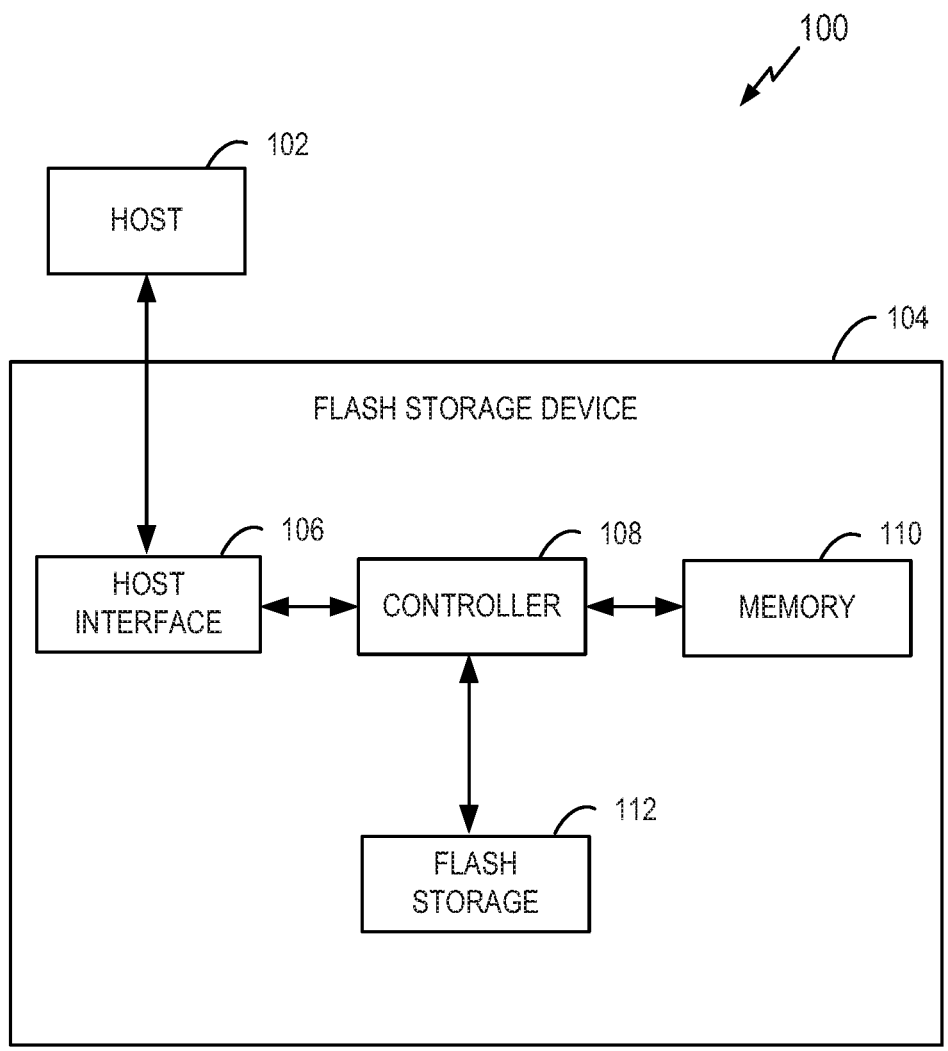
FIG. 1 is a block diagram of a flash storage device including a controller configured to predict a compressibility of a block of data in accordance with one embodiment of the disclosure.

Referring now to the drawings, embodiments of systems and methods for predicting a compressibility of a block of data are illustrated. One such system can include a number of components. An extractor can extract byte intervals from a block of data (e.g., a block of data from a flash storage), where each of the byte intervals consists of a preselected number of bytes. A hash can map the byte intervals into bins, where the bins include one bin for each possible value of the byte intervals. A counter can increment a hit count each time more than one of the byte intervals is mapped into a single bin of the bins. A compression determiner can determine whether to compress the block of data based on a comparison of a ratio of the hit count to a total number of the byte intervals and a preselected threshold. If the ratio is greater than the preselected threshold, the data block can be compressed. If not, the data block can be left un-compressed, while saving the power and time associated with trying to compress a data block without a capability to be substantially compressed. In a number of embodiments, the system is implemented in hardware in a very efficient manner that helps to ensure fast operation. For example, in one embodiment, the hash can map the byte intervals using less than the full number of bits contained in any one of the byte intervals. In one embodiment, the byte intervals are two bytes long. In one embodiment, a method for predicting a compressibility of a block of data can include performing the actions described above for the extractor, the hash, the counter, and the compression determiner. In a number of embodiments, the systems and methods for predicting a compressibility of a block of data can save power and time otherwise associated with compressing blocks having low compressibility.

FIG. 1 is a block diagram of a flash storage device including a controller configured to predict a compressibility of a block of data in accordance with one embodiment of the disclosure. The flash storage 100 includes a host 102 and a flash storage device 104 coupled to the host 102. The host 102 provides commands to the flash storage device 104 for transferring data between the host 102 and the flash storage device 104. For example, the host 102 may provide a write command to the flash storage device 104 for writing data to the flash storage device 104 or read command to the flash storage device 104 for reading data from the flash storage device 104. The host 102 may be any system or device having a need for data storage or retrieval and a compatible interface for communicating with the flash storage device 104. For example, the host 102 may a computing device, a personal computer, a portable computer, or workstation, a server, a personal digital assistant, a digital camera, a digital phone, or the like.

The flash storage device 104 includes a host interface 106, a controller 108, a memory 110, and a flash storage 112. The host interface 106 is coupled to the controller 108 and facilitates communication between the host 102 and the controller 108. Additionally, the controller 108 is coupled to the memory 110 and the flash storage 112. The host interface 106 may be any type of communication interface, such as an Integrated Drive Electronics (IDE) interface, a Universal Serial Bus (USB) interface, a Serial Peripheral (SP) interface, an Advanced Technology Attachment (ATA) interface, a Small Computer System Interface (SCSI), an IEEE 1394 (Firewire) interface, or the like. In some embodiments, the host 102 includes the flash storage device 104. In other embodiments, the flash storage device 104 is remote with respect to the host 102 or is contained in a remote computing system coupled in communication with the host 102. For example, the host 102 may communicate with the flash storage device 104 through a wireless communication link.

The controller 108 controls operation of the flash storage device 104. In various embodiments, the controller 108 receives commands from the host 102 through the host interface 106 and performs the commands to transfer data between the host 102 and the flash storage 112. The controller 108 may include any type of processing device, such as a microprocessor, a microcontroller, an embedded controller, a logic circuit, software, firmware, or the like, for controlling operation of the flash storage device 104.

Additionally, the controller 108 can be configured to extract byte intervals from a block of data (e.g., a block of data from a flash storage), where each of the byte intervals consists of a preselected number of bytes (e.g., two bytes), perform a hash function to map the byte intervals into a plurality of bins, where the plurality of bins include one bin for each possible value of the byte intervals, increment a hit count each time more than one of the byte intervals is mapped into a single bin of the plurality of bins, and determine whether to compress the block of data based on a comparison of a ratio of the hit count to a total number of the byte intervals and a preselected threshold. These functions will be described in more detail below.

In some embodiments, some or all of the functions described herein as being performed by the controller 108 may instead be performed by another element of the flash storage device 104. For example, the flash storage device 104 may include a microprocessor, a microcontroller, an embedded controller, a logic circuit, software, firmware, or any kind of processing device, for performing one or more of the functions described herein as being performed by the controller 108. In some embodiments, one or more of the functions described herein as being performed by the controller 108 are instead performed by the host 102. In some embodiments, some or all of the functions described herein as being performed by the controller 108 may instead be performed by another element such as a controller in a hybrid drive including both flash storage elements and magnetic storage elements.

The memory 110 may be any memory, computing device, or system capable of storing data. For example, the memory 110 may be a random-access memory (RAM), a dynamic random-access memory (DRAM), a static random-access memory (SRAM), a synchronous dynamic random-access memory (SDRAM), a flash storage, an erasable programmable read-only-memory (EPROM), an electrically erasable programmable read-only-memory (EEPROM), or the like. In various embodiments, the controller 108 uses the memory 110, or a portion thereof, to store data during the transfer of data between the host 102 and the flash storage 112. For example, the memory 110 or a portion of the memory 110 may be a cache memory.

The flash storage 112 receives data from the controller 108 and stores the data. The flash storage 112 may be any type of flash storage, such as a flash storage system, a solid-state drive, a flash memory card, a secure digital (SD) card, a universal serial bus (USB) memory device, a CompactFlash card, a SmartMedia device, a flash storage array, or the like.

While not bound by any particular theory it is noted that a number of compression algorithms have been proposed. As for these proposed compression algorithms, such as Huffman coding, arithmetic coding, Lempel-Ziv (LZ), and Lempel-Ziv-Welch (LZW), they often have a common theme. That is, these algorithms are often, or nearly always, looking for duplicate occurrences of data in a data block. A data block can be efficiently compressed when there are some duplicate data or data sequences in the block. This disclosure describes one or more algorithms that are based on this observation. For a data block, if the number of repeated data pairs is big enough, it can be considered highly compressible. In one example, the number of repeated data pairs may be calculated as follows. Suppose, for example, there is a data block consisting of the values {1, 2, 3, 4, 5, 6, 2, 5, 6, 2, 2, 2, 7, 7, 7, 7, 3, 4, 7, 7}. If it is divided into pairs, the data block becomes {1,2}, {3,4}, {5,6}, {2, 5}, {6, 2}, {2, 2}, {7, 7}, {7, 7}, {3,4}, {7, 7}, with a total of 10 data pairs. Data pairs {7, 7}, {7, 7}, {7,7} are the same. After the first {7,7} data pair, the {7,7} value is repeated twice in the data block. Thus, the number of repeated {7,7} data pairs is 2. Also, data pair {3,4} repeats once. As a result, the total number of repeated data pairs in this data block is 3. There are 3 repeated data pairs out of 10 data pairs. It can be concluded that the compressibility of this block is low. Aspects of this simple example will be explored in further detail below.

Figure 2:
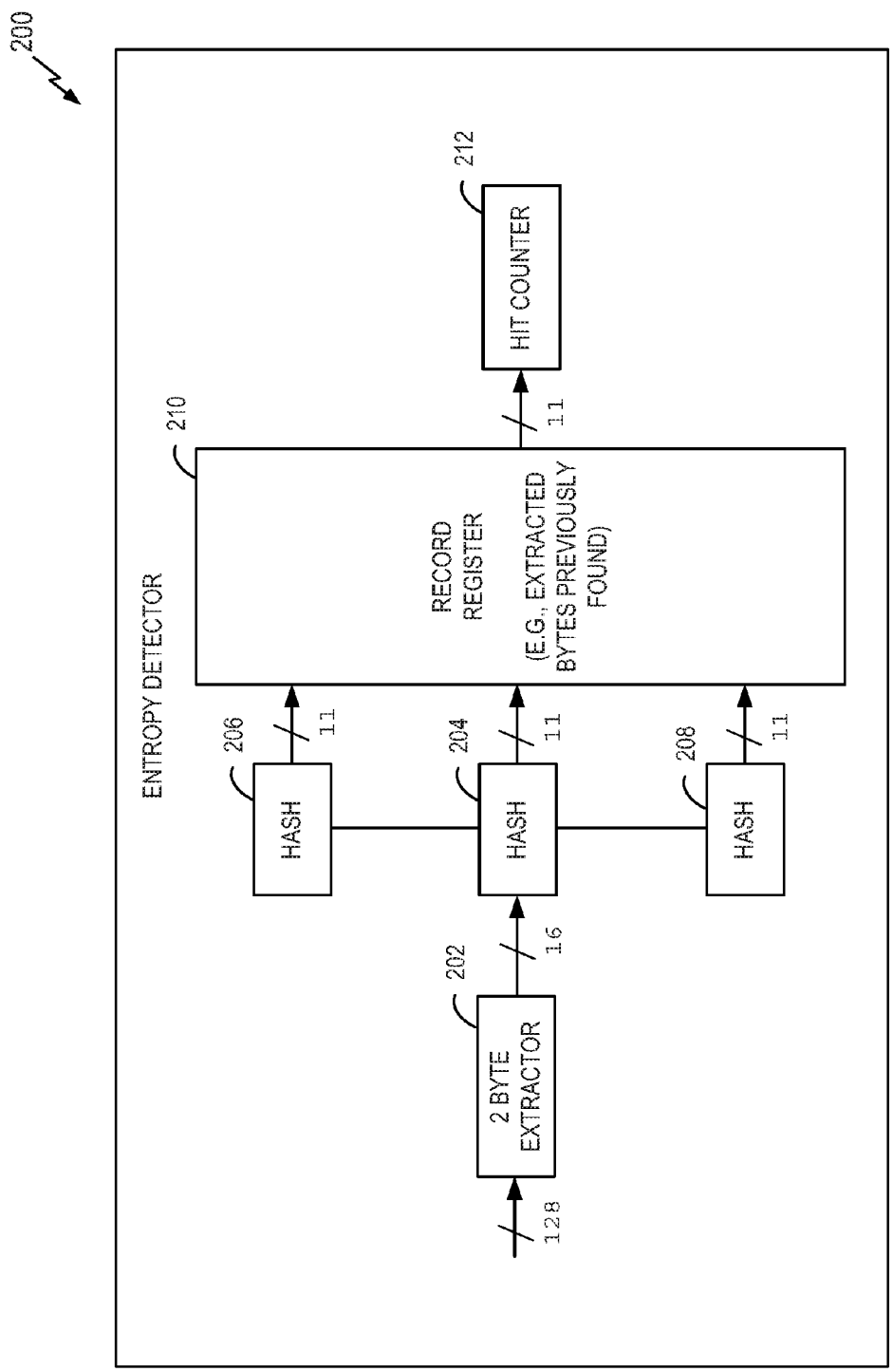
FIG. 2 is a block diagram of a system for predicting a compressibility of a block of data in accordance with one embodiment of the disclosure.

FIG. 2 is a block diagram of a system 200 for predicting a compressibility of a block of data in accordance with one embodiment of the disclosure. In some embodiments, the system 200 can be implemented with the controller 108 of FIG. 1. The system 200 (e.g., which may also be referred to as an entropy detector) includes a two byte extractor 202 coupled to a first hash 204, which is coupled to a second hash 206 and a third hash 208. Each of the hashes (204, 206, 208) is coupled to a record register 210 which is coupled to a hit counter 212.

In operation, the two byte extractor 202 can extract data in two byte intervals from a stream of data (e.g., 128 bytes at a time) from a block of data (e.g., a 4 k block of data from a flash storage such as 112 in FIG. 1). One or more of the three hashes (204, 206, 208) can receive the two bytes intervals of data (e.g., data pair) and map them into one bin of the record register 210. In the illustrated embodiment, the hashes can map only 11 of the 16 bits of the two byte interval. While not bound by any particular theory, it has been discovered that the entropy detection algorithms described herein can be sufficiently accurate in predicting compressibility of a data block while considering only a portion (e.g., 11 bits) of the two byte intervals.

The record register 210 can have a single bin for each possible value of the two byte intervals. Since the hashes are only mapping 11 bits of the 16 bit data pairs, the record register 210 can have as few as 2^11 bins or 2048 bins. The record register 210 can be initialized such that all bins are contain zeros. Whenever a data pair is first mapped into a bin, the bin register can be set to one.

The hit counter 212 can monitor the record register 210 and increment a hit count each time more than one of the two byte intervals (e.g., data pairs) is mapped into a single bin. That is, if a particular bin register in the record register 210 has been set to one (e.g., because a particular data pair was first encountered) and the hash (204, 206, 208) maps the same data pair to the same bin register at a subsequent time, then the counter 212 increments the hit count. The counter 212 can increment the hit count when this same sequence occurs at any of the 2048 bins of the record register 210. The hit counter 212 can efficiently be as small as an eleven bit counter.

In the embodiment illustrated in FIG. 2, the byte extractor 202 extracts byte intervals of two bytes from a data stream (e.g., 128 bytes at a time). In other embodiments, the byte extractor 202 can extract more than or less than 2 bytes of data at a time and the data stream can be more than or less than 128 bytes at a time. Similarly, while the hashes (204, 206, 208) in FIG. 2 use 11 bits of the two byte data pairs to map into the bins of the record register 210, they can use more than or less than 11 bits in other embodiments. In the embodiment of FIG. 2, the record register 210 has 2048 bins. In other embodiments, record register 210 can have more than or less than 2048 bins in accordance with aspects of an efficient implementation of the entropy detector. In the embodiment of FIG. 2, the hit counter 212 is an 11 bit counter. In other embodiments, hit counter 212 can have more than or less than 11 bits in accordance with aspects of an efficient implementation of the entropy detector. For example, in several embodiments, the hashes (204, 206, 208), record register 210 and hit counter 212 can have just enough bits to support the possible combinations of the number of bytes selected for the byte intervals at the extractor 202. Effectively, the implementation of the entropy detector 200 can be optimized to reduce implementation area (e.g., area for hardware/circuitry in a integrated circuit) and the power consumed.

As to the design of the hardware implementation of the entropy detector 200 in FIG. 2, it is noted that a 4 k data block size was chosen for the example. So the 4 k data block has 2 k data pairs. The data width is 8 bits. For the 8 bit data pairs, the possible number of data pairs would be 256 multiplied by 256 or 65536 possible pairs. So the design can have a 64 k 1 bit register file (e.g., bins of the record register 210) to record if one pair already exists in the block. Similarly, the design can have an 11 bit counter because the maximum number of repeated data pairs could be to 2 k–1. The counter (e.g., hit counter 212) can be zero at initial time. Similarly, the 64 k record register 210 can be made zero during initialization. When a data pair first comes out, the entropy detector 200 can write its related record register (e.g., bin) to '1'. When this data pair shows up again, the hardware (e.g., entropy detector 200) knows this because its record register is '1'. Add 1 to the counter (e.g., at the hit counter 212) because a repeated data pair is found. While this paragraph discusses some particular values and sizes of various hardware components, these components can have other suitable values for counting repeated data intervals and thereby predicting the compressibility of a data block. For example, it has been determined that the hashes can map only a portion of the 16 bits (e.g., 11 bits) to the record register and still obtain accurate compression predictions. In such case, the bit size of the other components, such as the record register and hit counter, may be reduced accordingly.

In this context, the controller 108 of FIG. 1 and entropy detector 200 of FIG. 2 can refer to any machine or selection of logic that is capable of executing a sequence of instructions and should be taken to include, but not limited to, general purpose microprocessors, special purpose microprocessors, central processing units (CPUs), digital signal processors (DSPs), application specific integrated circuits (ASICs), signal processors, microcontrollers, and other suitable circuitry. Further, it should be appreciated that the term processor, microprocessor, circuitry, controller, and other such terms, refer to any type of logic or circuitry capable of executing logic, commands, instructions, software, firmware, functionality, or other such information.

The system 200 of FIG. 2 can represent an efficient hardware implementation of a method for predicting a compressibility of a block of data. The hardware implementation is efficient in that only the minimum sized components (e.g., in terms of number of bits), and in some cases less than the minimum sized components such as in the case of the hashes, are used. As a result of this efficient hardware implementation, and possibly other similar hardware implementations, the speed of operation for the system 200 is much faster than any known software implemented solutions for data compressibility prediction. For example, the speed of operation for the system 200 can be on the order of nanoseconds, while the speed of operation for such software implemented solutions can be on the order of milliseconds. Thus, the hardware implemented system 200 can be up to 1000 times faster than comparative software implemented solutions. In other embodiments, the hardware implemented system 200 can be just 10 or 100 times faster than the comparative software implemented solutions.

To validate design of the entropy detector 200 of FIG. 2 and the general algorithm, it has been tested with some high compressibility standard compression files and also some low compressibility files to compare the results. These results are illustrated in FIG. 3.

FIG. 3 is a table illustrating exemplary simulation results for a system for predicting a compressibility of various test blocks of data in accordance with one embodiment of the disclosure. Column headings at the top of the table illustrate the names of various files (e.g., data blocks) that were tested. Row heading at the left side of the table include the original file size, the compressed size following compression, the rate/degree of compression, and the algorithm/process ratio ("repeated data pairs ratio") for the percentage of repeated data pairs found based on the 10-16 bits considered. It should be noted that the compression ratio may be defined as the uncompressed size divided by the compressed size. Also, the repeated data pairs ratio may be defined as the number of repeated data pairs divided by the number of total data pairs.

Considering the table data for highly compressible files, whose compression rates are higher than 2 (see for example, data in columns headed by filenames include "alice29.txt", "asyoulik.txt", or "sum" in FIG. 3), the repeated data pairs ratios are all above 70%. For these files (e.g., data blocks) having higher compression ratios, the table illustrates corresponding higher repeated data pairs ratios for those files. For low compressible files (see for example, data in columns headed by filenames include "pdf1.pdf" and "XL1.xls" in FIG. 3), their repeated data pairs ratios are under 20%.

For a hardware implementation of the algorithm (e.g., see entropy detector 200 of FIG. 2), it has been observed that the algorithm can compare only part of the data and thereby have lower hardware costs with roughly the same functionality. For example, for an 8 bit data pair, which has a total of 16 bits, the test results of FIG. 3 show that the algorithm/ entropy detector can compare only 15 bits of the 16 bits and the results of the repeated data pairs ratio are not changed significantly. In such case, the hardware implementation may only need 64 k divided by 2 or 32 k registers (e.g., for the record register 210) and still can get accurate results for judging whether a given file (e.g., data block) is highly compressible or not. Also, adding a randomizer (e.g., scrambler) can make the results more reliable (e.g., by randomizing the input data, statistical results are more accurate and reliable). In the simulation of FIG. 3, the table shows results from use of a full 16 as compares with use of less bits (e.g., down to 10 bits). From the table results, this simulation shows that it is possible to compare 11 bits of the data and still ensure a correct judgment/prediction of compressibility of the data block. In one embodiment, a 50% repeated data pairs ratios can be used as a threshold to identify whether a given file/data block is highly compressible or not. As shown in FIG. 2, the design may only need 2 k record registers for implementation. In some synthesis results for the algorithm and implementation of FIG. 2, the power cost of executing the algorithm is relatively small.

So the systems and algorithms described herein can be used to save power by avoiding the compression of low compressibility data blocks. As an example of the potential power savings, consider a system (e.g., predictor) implemented in hardware with 28 nanometer (nm) technology at roughly 800 megahertz (MHz) has about 10 milliwatts (mW) power consumption. A compression operation with these same hardware parameters will consume about 1 to 1.5 Watts (W). As a result, the system/predictor will provide a power savings of at least 1 W minus 10 mW or 990 mW.

Figure 4:
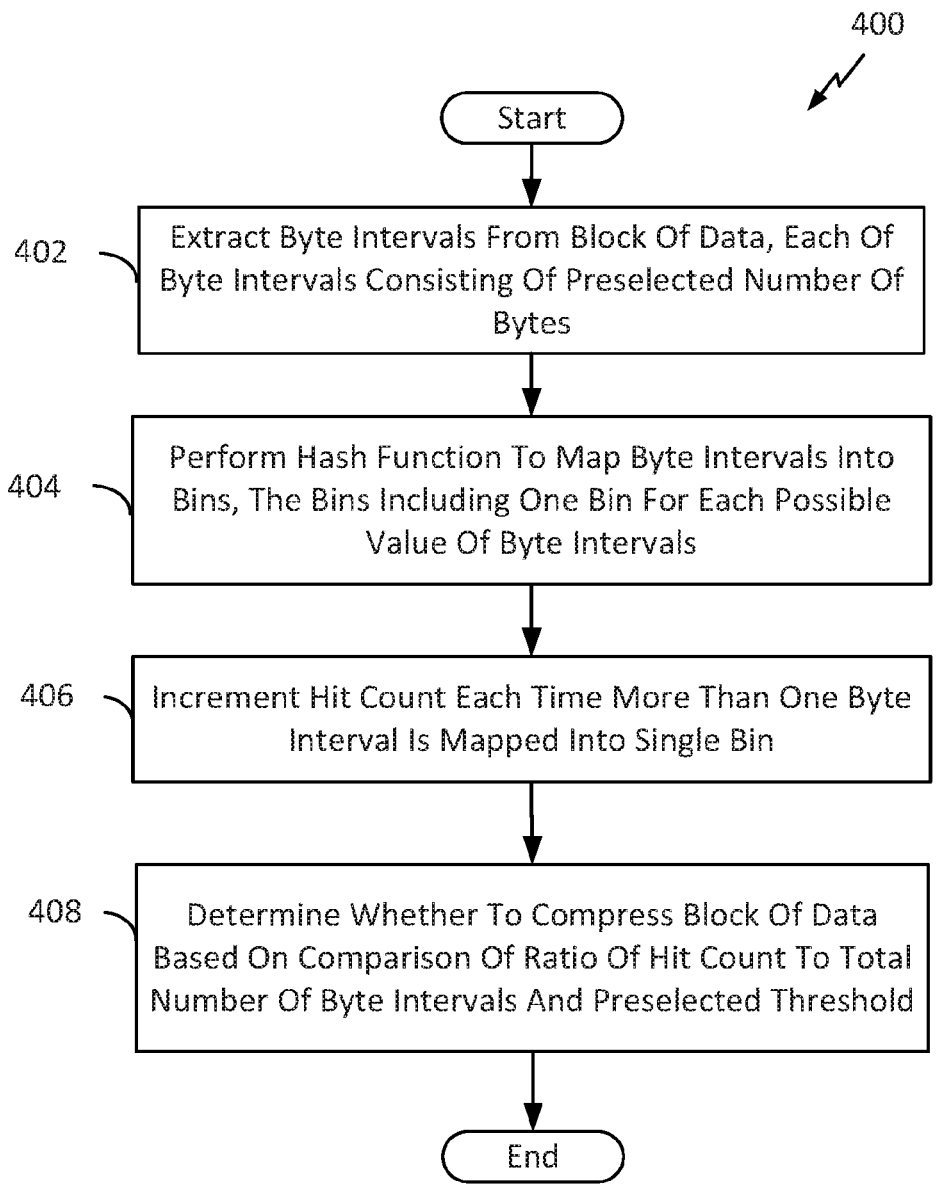
FIG. 4 is a flowchart of a process for predicting a compressibility of a block of data in accordance with one embodiment of the disclosure.

FIG. 4 is a flowchart of a process for predicting a compressibility of a block of data in accordance with one embodiment of the disclosure. In specific embodiments, the process may be performed by the entropy detector 200 of FIG. 2, the controller 108 of FIG. 1, or other circuitry (e.g., circuitry residing along the data path in a flash storage device or circuitry for performing data compression). In block 402, the process extracts byte intervals from the block of data, each of the byte intervals consisting of a preselected number of bytes. In one embodiment, the preselected number of bytes is two bytes. In the embodiment of FIG. 2, the extractor 202 can perform this function.

In block 404, the process performs a hash function to map the byte intervals into a plurality of bins, the plurality of bins including one bin for each possible value of the byte intervals. In several embodiments, the plurality of bins includes one bin, or at least one bin, for each possible value of the byte intervals. In one embodiment, the hashes (204, 206, 208) of FIG. 2 can perform this function. In one embodiment, the process can use less than the total number of bits in the preselected number of bytes of the byte intervals in performing the hash function to map the byte intervals.

In block, 406, the process increments a hit count each time more than one of the byte intervals is mapped into a single bin of the plurality of bins. In one embodiment, the hit counter 212 of FIG. 2 can perform this function.

In block 408, the process determines whether to compress the block of data based on a comparison of a ratio of the hit count (e.g., a total hit count) to a total number of the byte intervals and a preselected threshold. If the ratio is greater than the preselected threshold, the process can compress the data block. In several embodiments, the process can use one or more of the data compression techniques known in the art (e.g., Lempel-Ziv-Welch (LZW) compression, Snappy compression, and the like). On the other hand, if the ratio is less than the preselected threshold, the process can choose not to compress the data block. In one embodiment, the preselected threshold is 50%. In another embodiment, the preselected threshold is 45%. In other embodiments, the preselected threshold can have other suitable threshold values.

In a number of embodiments, the process first initializes the hit count to zero and all of the bins to zero.

In one embodiment, the process can perform the sequence of actions in a different order. In another embodiment, the process can skip one or more of the actions. In other embodiments, one or more of the actions are performed simultaneously. In some embodiments, additional actions can be performed.

To validate this proposed process/algorithm, it has been tested with some high and low compressibility standard compression files with certain thresholds. The results are illustrated in FIG. 5.

FIG. 5 is a table illustrating exemplary test results for a process for predicting a compressibility of various test blocks of data in accordance with one embodiment of the disclosure. Column heading at the top of the table illustrate the names of various files (e.g., data blocks) that were tested. Row headings at the left side of the table include the original file size, the compressed size following compression, the rate/degree of compression, the algorithm/process ratio ("16-11 random") for the percentage of repeated data pairs found, a 45% threshold for whether to compress, and a 50% threshold for whether to compress. The results show that the compression prediction algorithm (e.g., the one implemented in FIG. 2 with 2 byte data intervals) can fairly accurately predict a degree of compressibility of a given file (e.g., data block). The results further show that the results of the compression prediction algorithm can be compared against a preselected threshold to make a sound judgment as to whether a given file/data block should be compressed based on a desire to limit the compression of data blocks that have low compressibility (e.g., may only be compressed by less than 45%). It should be noted that the degree of low compressibility for data blocks may be changed in accordance with particular design goals/applications. For example, in one embodiment, the threshold for compressibility can be set lower to save additional power. On the other hand, the threshold could be set higher to save storage space (e.g., in a flash storage device). In several embodiments, the threshold is between 40 and 55 percent, or between about 40 and about 55 percent.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner Tasks or events may be added to or removed from the disclosed example embodiments. The example systems and components described herein may be configured differently than described. For example, elements may be added to, removed from, or rearranged compared to the disclosed example embodiments.

What is claimed is:

1. A method for predicting a compressibility of a block of data, comprising:
   extracting byte intervals from the block of data, each of the byte intervals consisting of a preselected number of bytes;
   performing a hash function to map the byte intervals into a plurality of bins, the plurality of bins comprising one bin for each possible value of the byte intervals;
   incrementing a hit count each time more than one of the byte intervals is mapped into a single bin of the plurality of bins; and
   determining whether to compress the block of data based on a comparison of a ratio of the hit count to a total number of the byte intervals and a preselected threshold.

2. The method of claim 1, wherein the preselected number of bytes for the byte intervals is two bytes.

3. The method of claim 1, wherein the performing the hash function to map the byte intervals into the plurality of bins comprises performing the hash function using less than a total number of bits in the preselected number of bytes.

4. The method of claim 1, further comprising:
   if the ratio of the hit count to the total number of the byte intervals is greater than the preselected threshold, compressing the data block.

5. The method of claim 1, further comprising:
   if the ratio of the hit count to the total number of the byte intervals is less than the preselected threshold, determining not to compress the data block.

6. The method of claim 1, wherein the block of data is a block in a flash storage device.

7. The method of claim 1, wherein the plurality of bins consists of one bin for each possible value of the byte intervals.

8. The method of claim 1, wherein the extracting byte intervals from the block of data comprises:
   setting the plurality of bins to zero;
   setting the hit count to zero; and
   extracting byte intervals from the block of data.

9. The method of claim 8:
   wherein the performing the hash function to map the byte intervals into the plurality of bins comprises:
      setting, if a current bin of the plurality of bins mapped to a current byte interval of the byte intervals is not set to one, the current bin to one; and
   wherein the incrementing the hit count each time more than one of the byte intervals is mapped into the single bin of the plurality of bins comprises:
      incrementing, if the current bin mapped to the current byte interval is set to one, the hit count.

10. A system for predicting a compressibility of a block of data, comprising:
    an extractor configured to extract byte intervals from the block of data, each of the byte intervals consisting of a preselected number of bytes;
    a hash configured to map the byte intervals into a plurality of bins, the plurality of bins comprising one bin for each possible value of the byte intervals;
    a counter configured to increment a hit count each time more than one of the byte intervals is mapped into a single bin of the plurality of bins; and
    a compression determiner configured to determine whether to compress the block of data based on a comparison of a ratio of the hit count to a total number of the byte intervals and a preselected threshold.

11. The system of claim 10, wherein the preselected number of bytes for the byte intervals is two bytes.

12. The system of claim 10, wherein the hash maps the byte intervals into the plurality of bins using less than a total number of bits in the preselected number of bytes.

13. The system of claim 10, further comprising:
    a compressor configured to compress the data block if the ratio of the hit count to the total number of the byte intervals is greater than the preselected threshold.

14. The system of claim 10, further comprising:
    a compressor configured not to compress the data block if the ratio of the hit count to the total number of the byte intervals is less than the preselected threshold.

15. The system of claim 10, wherein the block of data is a block in a flash storage device.

16. The system of claim 10, wherein the plurality of bins consists of one bin for each possible value of the byte intervals.

17. The system of claim 10:
    wherein the plurality of bins is initially set to zero; and
    wherein the hit count is initially set to zero.

18. The system of claim 17:
wherein the system is configured to set, if a current bin of the plurality of bins mapped to a current byte interval of the byte intervals is not set to one, the current bin to one; and
wherein the counter is configured to increment, if the current bin mapped to the current byte interval is set to one, the hit count.

* * * * *